(12) United States Patent
Bi

(10) Patent No.: US 12,032,468 B2
(45) Date of Patent: Jul. 9, 2024

(54) METHOD AND DEVICE FOR DISPLAYING REPRESENTATION INDICATOR OF OBJECT

(71) Applicant: HUAWEI TECHNOLOGIES CO., LTD., Guangdong (CN)

(72) Inventor: Gang Bi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 17/570,472

(22) Filed: Jan. 7, 2022

(65) Prior Publication Data

US 2022/0129504 A1 Apr. 28, 2022

Related U.S. Application Data

(63) Continuation of application No. PCT/CN2019/095166, filed on Jul. 9, 2019.

(51) Int. Cl.
*G06F 11/34* (2006.01)
*G06F 3/14* (2006.01)
*G06F 11/32* (2006.01)

(52) U.S. Cl.
CPC ............ *G06F 11/3452* (2013.01); *G06F 3/14* (2013.01); *G06F 11/321* (2013.01); *G06F 11/3495* (2013.01)

(58) Field of Classification Search
CPC ...... G06F 11/3452; G06F 3/14; G06F 11/321; G06F 11/3495; G06F 11/301; G06F 11/30; G06F 11/32; G06F 11/323; G06F 11/34

(Continued)

(56) References Cited

U.S. PATENT DOCUMENTS

| 9,495,270 B2 | 11/2016 | Wong |
| 2013/0300747 A1 | 11/2013 | Wong et al. |

(Continued)

FOREIGN PATENT DOCUMENTS

| CN | 104881347 A | 9/2015 |
| CN | 109634801 A | 4/2019 |

OTHER PUBLICATIONS

Wikipedia "Rendering" page, from date Jun. 29, 2019, retrieved from https://web.archive.org/web/20190629021511/https://en.wikipedia.org/wiki/Rendering_(computer_graphics)#Sampling_and_filtering (Year: 2019).*

(Continued)

*Primary Examiner* — Yair Leibovich

(57) ABSTRACT

Embodiments of this application provide a method and a device for displaying a representation indicator of an object. In the method, values of representation indicators of a plurality of monitored objects at a plurality of sampling time points are determined; and image information used to display changes of the representation indicators is generated, where the image information includes the plurality of sampling time points, values of representation indicators of a plurality of objects that meet a sorting requirement at the plurality of sampling time points, and association information, and the association information is used to associate values of representation indicators that are at a same sorting position at the plurality of sampling time points, to reflect changes of the values of the representation indicators that are at the same sorting position.

20 Claims, 9 Drawing Sheets

(58) Field of Classification Search
USPC .......................................................... 714/1
See application file for complete search history.

(56) References Cited

U.S. PATENT DOCUMENTS

| | | |
|---|---|---|
| 2015/0229546 A1 | 8/2015 | Somaiya et al. |
| 2017/0323148 A1* | 11/2017 | Sarkar .................. G06T 7/0012 |
| 2018/0046620 A1 | 2/2018 | Sasaki et al. |

OTHER PUBLICATIONS

European Search Report for Application No. 19936856.4 dated May 2, 2022, 6 pages.
International Search Report and Written Opinion issued in PCT/CN2019/095166, dated Apr. 3, 2020, 10 pages.

* cited by examiner

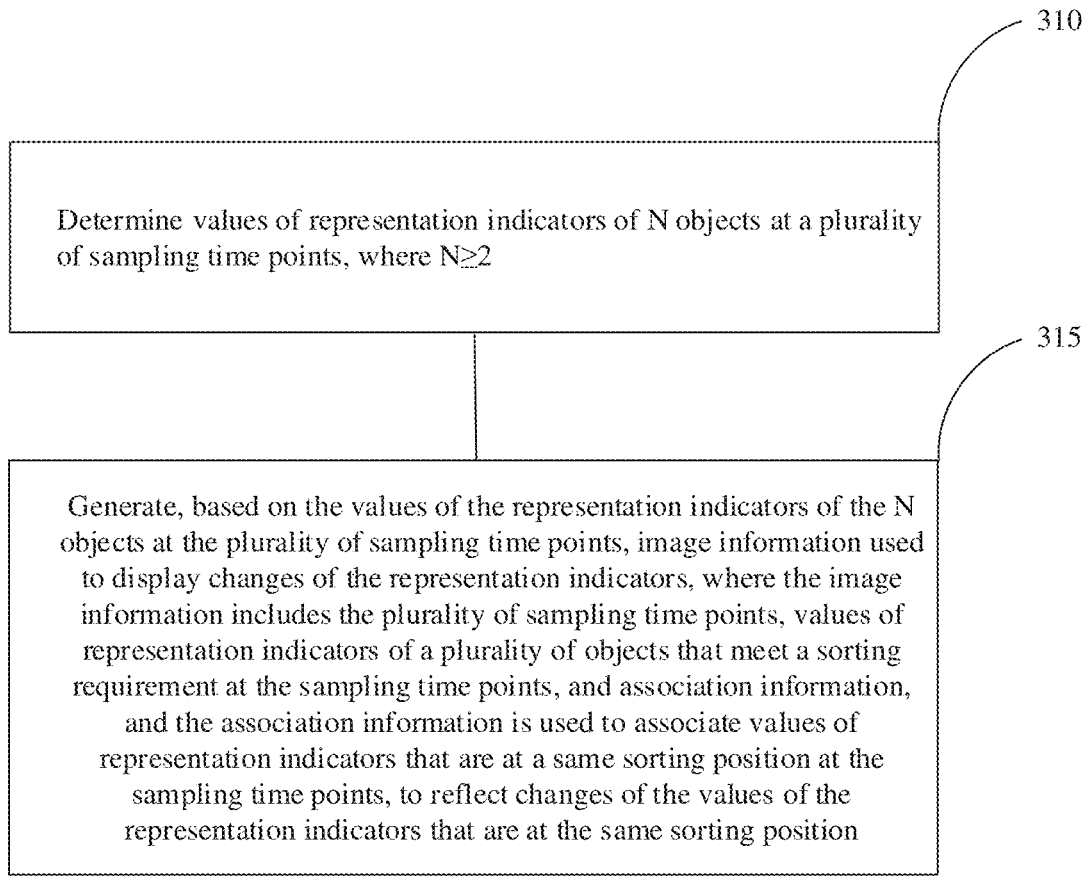

310

Determine values of representation indicators of N objects at a plurality of sampling time points, where N≥2

315

Generate, based on the values of the representation indicators of the N objects at the plurality of sampling time points, image information used to display changes of the representation indicators, where the image information includes the plurality of sampling time points, values of representation indicators of a plurality of objects that meet a sorting requirement at the sampling time points, and association information, and the association information is used to associate values of representation indicators that are at a same sorting position at the sampling time points, to reflect changes of the values of the representation indicators that are at the same sorting position

FIG. 3

| Sampling time<br>Virtual machine identifier | T1 | T2 | T3 | T4 |
|---|---|---|---|---|
| Virtual machine 1 | 500 | 550 | 430 | 450 |
| Virtual machine 2 | 400 | 300 | 450 | 550 |
| Virtual machine 3 | 300 | 500 | 290 | 260 |
| Average value | 400 | 450 | 390 | 420 |

FIG. 4a

METHOD AND DEVICE FOR DISPLAYING REPRESENTATION INDICATOR OF OBJECT

CROSS-REFERENCE TO RELATED APPLICATIONS

This application is a continuation of International Application No. PCT/CN2019/095166, filed on Jul. 9, 2019, the disclosure of which is hereby incorporated by reference in its entirety.

TECHNICAL FIELD

This application relates to the communications field, and in particular, to a method and a device for displaying a representation indicator of an object.

BACKGROUND

There are usually a large quantity of virtual machines in a distributed cluster environment. To ensure stable and normal running of the virtual machines, representation indicators of the virtual machines need to be monitored by using a cluster monitoring device, to detect an abnormal virtual machine, and give an alarm if necessary. In a currently used manner, usually specific representation indicators of the virtual machines are respectively listed one by one, but related indicator information of only a single virtual machine can be displayed at a time. Alternatively, real-time indicator information of all virtual machines can be simultaneously displayed, but a change trend of the indicator information in a specific time period cannot be reflected. In addition, when there are a relatively large quantity of virtual machines, split-screen display is required. In the foregoing two display manners, an overall indicator status of all the virtual machines in the cluster cannot be intuitively and centrally reflected. Consequently, in actual application, a user cannot quickly evaluate an overall health condition of cluster nodes, and cannot effectively locate an abnormal virtual machine.

SUMMARY

Embodiments of this application provide a method and a device for displaying a representation indicator of an object, to help intuitively and quickly evaluate an overall health condition of monitored objects in an environment such as a distributed cluster, and locate an abnormal object.

According to a first aspect, a method for displaying a representation indicator of an object is provided. The method includes:

determining values of representation indicators of N objects at a plurality of sampling time points, where N≥2; and generating, based on the values of the representation indicators of the N objects at the plurality of sampling time points, image information used to display changes of the representation indicators, where the image information includes the plurality of sampling time points, values of representation indicators of a plurality of objects that meet a sorting requirement at the sampling time points, and association information, and the association information is used to associate values of representation indicators that are at a same sorting position at the sampling time points, to reflect changes of the values of the representation indicators that are at the same sorting position.

In an example embodiment of the first aspect, the changes of the values of the representation indicators are displayed based on the image information.

Optionally, a running status of one or more of the objects is evaluated based on the displaying of the changes of the values of the representation indicators.

Optionally, the association information is represented as that the values of the representation indicators that are at the same sorting position at the sampling time points are displayed by using a same feature.

Optionally, the same feature is a same color, size, shape, or category.

Optionally, the association information is represented as that the values of the representation indicators that are at the same sorting position at the sampling time points are connected to form a complete broken line or curve in a same color, and broken lines or curves formed by values of representation indicators at different sorting positions are different in color.

Optionally, the representation indicator includes a CPU, a memory, an I/O, a network delay, a packet loss rate, traffic, queries per second (QPS), transactions per second (TPS), a duration (DT), or a disk space usage.

Optionally, the image information further includes identifiers of the plurality of objects that meet the sorting requirement at the sampling time points, and each of the identifier may uniquely identify one of the plurality of objects; and the displaying of the changes of the values of the representation indicators includes: simultaneously displaying identifiers of objects and values of representation indicators that correspond to one or more specified sorting positions at a specific sampling time point.

In this embodiment, related information of a plurality of monitored objects whose values of representation indicators are at higher ranks at sampling time points can be determined by comparing values of representation indicators of the plurality of monitored objects in a network environment in a sampling time period, and related information at a same sorting position is associated, to intuitively display a possible abnormal trend of the monitored objects and locate a monitored object that abnormally runs in the sampling time period. In this way, abnormality check efficiency of the monitored objects is greatly improved.

In another example embodiment of the first aspect, further, a plurality of pieces of image information used to display the changes of the representation indicators are generated, and the plurality of pieces of image information respectively reflect changes of a plurality of representation indicators.

Optionally, the changes of values of the plurality of representation indicators are displayed based on the plurality of pieces of image information.

In this embodiment, the changes of the values of the plurality of representation indicators of the monitored objects can be simultaneously displayed and compared, to help more comprehensively monitor a status of the objects, and find a possible cause for abnormality through comparative analysis.

In another example embodiment of the first aspect, the image information further includes average values of the values of the representation indicators of the N objects at the sampling time points; and the displaying of the changes of the values of the representation indicators includes: displaying changes of the average values.

Optionally, only some specified sorting positions and/or corresponding changes of average values are displayed by controlling button selection.

In this embodiment, an overall change trend of the representation indicators of the monitored objects can be further reflected based on changes of values of representation indicators of the plurality of objects at different sorting positions and the changes of the average values of the values of the representation indicators of the plurality of objects, to intuitively present a monitored object that is obviously abnormal when compared with the whole, so as to help a user more conveniently and quickly learn of an overall health condition of the monitored objects, and further improve evaluation and abnormality check efficiency in the network environment.

According to a second aspect, a device for displaying a representation indicator of an object is provided. The device includes:
- a determining unit, configured to determine values of representation indicators of N objects at a plurality of sampling time points, where N≥2; and
- a generation unit, configured to generate, based on the values of the representation indicators of the N objects at the plurality of sampling time points, image information used to display changes of the representation indicators, where the image information includes the plurality of sampling time points, values of representation indicators of a plurality of objects that meet a sorting requirement at the sampling time points, and association information, and the association information is used to associate values of representation indicators that are at a same sorting position at the sampling time points, to reflect changes of the values of the representation indicators that are at the same sorting position.

Another optional implementation of the device solution in the second aspect corresponds to the method solution described in the first aspect.

According to a third aspect, a computer-readable storage medium is provided. The storage medium stores a computer program that is used to perform the corresponding method for displaying a representation indicator of an object described in the first aspect.

According to a fourth aspect, a device is provided, and includes a processor and a memory. The memory is configured to store a computer program, and the processor is configured to invoke the computer program stored in the memory, to perform the corresponding method described in the first aspect.

BRIEF DESCRIPTION OF DRAWINGS

FIG. 3 is a schematic flowchart of a method for displaying a representation indicator of an object according to an embodiment of this application;

FIG. 4a and FIG. 4b are schematic diagrams of displaying changes of representation indicators according to an embodiment of this application;

DESCRIPTION OF EMBODIMENTS

To make the objectives, technical solutions, and advantages of this application clearer, the following further describes in detail embodiments of this application with reference to the accompanying drawings.

An application scenario described in the embodiments of this application is intended to more clearly describe the technical solutions of the embodiments of this application, and does not constitute a limitation on the technical solutions provided in the embodiments of this application. A person of ordinary skill in the art may learn that the technical solutions provided in the embodiments of this application are also applicable to a similar technical problem as a network architecture evolves and a new application scenario emerges.

Figure 1:
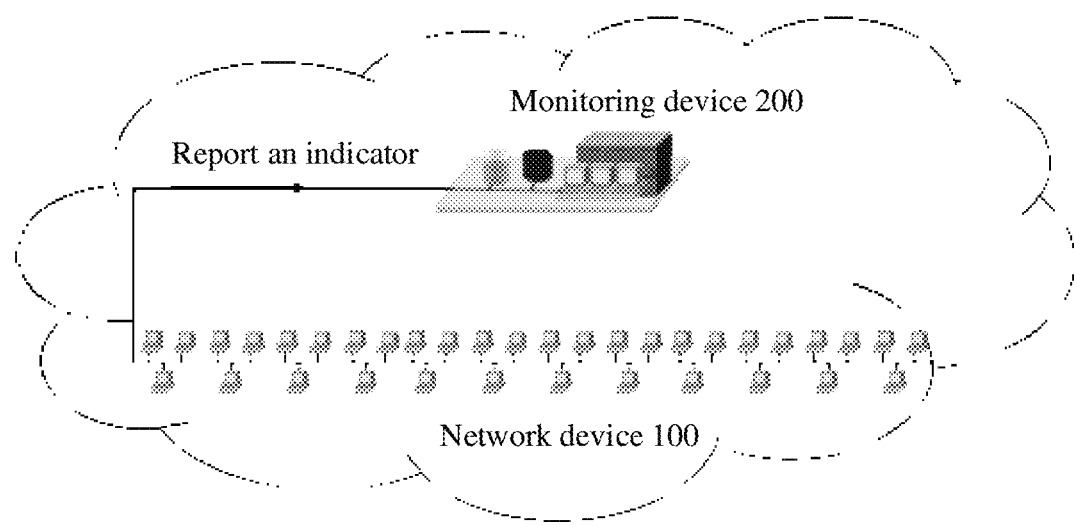
FIG. 1 is a schematic diagram of an architecture of a network device according to an embodiment of this application.

FIG. 1 is a schematic diagram of an architecture of a network device according to an embodiment of this application, to implement monitoring, management, and the like of the network device. The architecture of the network device includes a monitoring device 200 and a plurality of monitored or managed network devices 100. For example, the network devices 100 may actively and periodically or aperiodically report monitored representation indicators to the monitoring device 200. Alternatively, when the monitoring device 200 sends a collection instruction, performs a trigger operation, or so on, the network devices 100 may report monitored representation indicators. Alternatively, any other possible manner is used, provided that the monitoring device 200 can finally obtain representation indicators of the plurality of monitored network devices 100.

Figure 2:
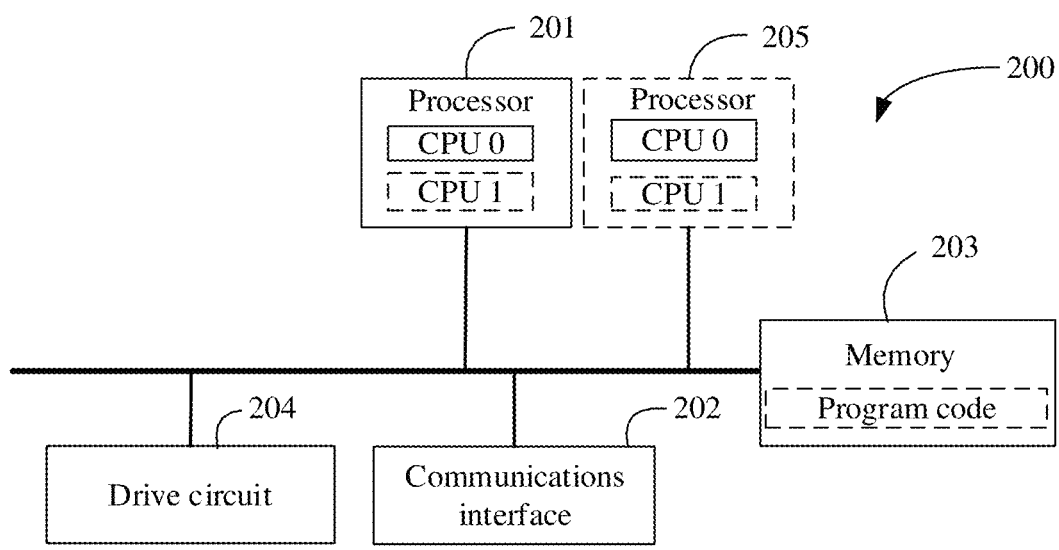
FIG. 2 is a schematic diagram of a structure of a monitoring device according to an embodiment of this application.

FIG. 2 is an example schematic diagram of a structure of a monitoring device 200 according to an embodiment of this application. The monitoring device 200 may be configured to monitor each network device in a network device environment. The monitoring device 200 includes at least a processor 201, a communications interface 202, a memory 203, and a drive circuit 204.

The communications interface 202 is configured to: receive data sent by the network device, and send data to the network device.

The memory 203 is configured to store computer-readable instructions and data.

The processor 201 is configured to: read the instructions and the data stored in the memory 203, and perform a specific operation based on the instructions and the data.

The processor 201 may be an integrated circuit chip that has a signal processing capability. In an example implementation process, the methods described in the embodiments can be implemented by using a hardware integrated logical circuit in the processor, or by using instructions in a form of software. These instructions may be implemented and controlled through cooperation of the processor, and are used to perform the methods disclosed in the embodiments of this application. The processor may alternatively be a general purpose processor, a digital signal processor (DSP), an application-specific integrated circuit, a field programmable gate array (FPGA) or another programmable logic device, a discrete gate or transistor logic device, or a discrete hardware component.

The processor 201 may alternatively be a general-purpose processor, a microprocessor, any conventional processor, a decoder, or the like. Further, there may be a plurality of processors. For example, there are both the processor 201 and a processor 205, or more processors. The specific operation performed based on the instructions and the data may be directly performed by a hardware processor, or may be performed by a combination of hardware in a processor and a software module. The software module may be located in an existing storage medium in the art, such as a random access memory, a flash memory, a read-only memory, a programmable read-only memory, an electrically erasable programmable memory, or a register.

The drive circuit 204 is configured to drive each piece of hardware in the monitoring device, so that each piece of hardware can normally work.

A person skilled in the art also knows that a monitored object is not limited to the network device 100. The monitored "object" in the embodiments of this application refers to hardware, software, or a component thereof at each possible granularity. For example, the hardware or software may be an independent running device, for example, the network device 100 shown in FIG. 1, application software that may independently run, or hardware, software, or a component of a hardware/software device, for example, a kernel or a process. Anything that has a representation indicator that can be finally determined in various possible manners, such as invoking or sending, may be referred to as an "object".

The "representation indicator" in the embodiments of this application is an indicator that can be represented and that can reflect a running status, a health status, or the like of an object. The "indicator that can be represented" may be directly represented in a data form or in another form, provided that the indicator can be finally quantified directly or relatively.

FIG. 3 shows a method for displaying a representation indicator of an object according to an embodiment of this application. The method includes the following content.

S310. Determine values of representation indicators of N objects at a plurality of sampling time points, where N≥2.

For ease of understanding, a method for displaying representation indicators of a plurality of virtual machines included in a network in a cluster environment is described in detail herein by using an example in which the network is monitored. The values of the representation indicators of the N (N≥2) objects, namely, N virtual machines, in the distributed cluster environment at the plurality of sampling time points are determined. For example, the representation indicator includes a CPU, a memory, an I/O, a network delay, a packet loss rate, traffic, queries per second (QPS), transactions per second (TPS), a duration (DT), or a disk space usage, and may be another representation indicator that needs to be monitored, for example, a success rate or a failure rate of an action such as requesting, forwarding, or receiving. This is not specifically limited herein. The plurality of sampling time points may be set at an equal interval, for example, an interval of 10 s, or may be set at a preset unequal time interval. Representation indicators of the virtual machines are obtained at each interval time point. For example, as shown in FIG. 4a, data values of representation indicators corresponding to three virtual machines at four sampling time points T1 to T4 may be separately determined. In an example, a monitoring device 200 may receive the values that are of the representation indicators of the N objects at the plurality of sampling time points and that are detected by another device. Alternatively, the monitoring device 200 may monitor the N objects, to obtain the values of the representation indicators of the N objects at the plurality of sampling time points. In either of the two manners, the monitoring device 200 can determine the values.

S315. Generate, based on the values of the representation indicators of the N objects at the plurality of sampling time points, image information used to display changes of the representation indicators, where the image information includes the plurality of sampling time points, values of representation indicators of a plurality of objects that meet a sorting requirement at the sampling time points, and association information, and the association information is used to associate values of representation indicators that are at a same sorting position at the sampling time points, to reflect changes of the values of the representation indicators that are at the same sorting position.

Figure 4B:
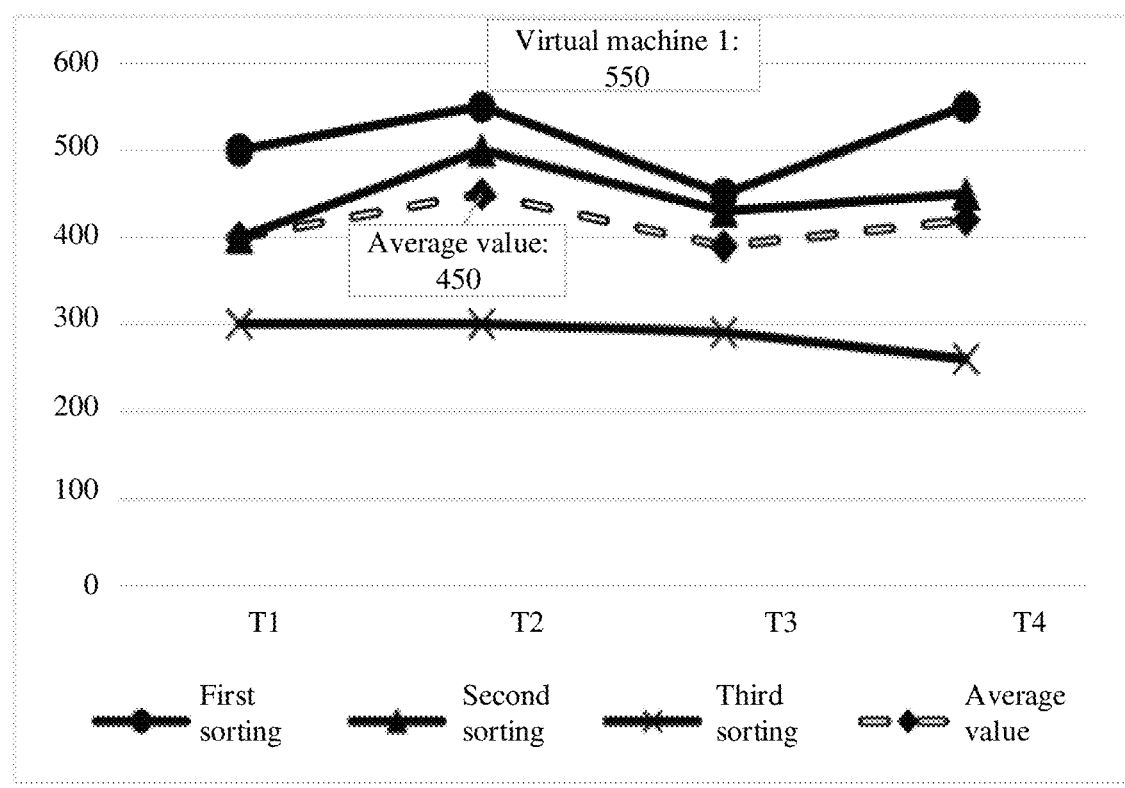

FIG. 4a is still used as an example. At the four sampling time points T1, T2, T3, and T4, largest representation indicator data values of the representation indicators are sequentially 500, 550, 450, and 450, and the four data values form a data value set at a first sorting position. Each sampling time point is used as a horizontal coordinate, and the data value corresponding to the corresponding sampling time point and at the first sorting position is a vertical coordinate, to generate image information that meets a requirement of the first sorting position. Association of the image information may be represented by using the association information. The association information is used to associate the values of the representation indicators that are at the same sorting position at the sampling time points, to reflect the changes of the values of the representation indicators that are at the same sorting position. In an embodiment, a same feature may be used for displaying the association information in the image information that meets the requirement of the first sorting position. For example, the values of the representation indicators at the first sorting position at the sampling time points are represented in a same shape. FIG. 4b is a display diagram that reflects changes of the values of the representation indicators listed in FIG. 4a. For presentation in FIG. 4b, association information of each value in the data value set at the first sorting position is represented by using a circle. Similarly, data value sets at a second sorting position and a third sorting position are separately determined, and image information that meets requirements of the corresponding sorting positions is separately generated. In FIG. 4b, association information of the data value sets at the second sorting position and the third sorting position is respectively represented by using a triangle and a cross. In another embodiment, the association information may be represented by using a same color, size, or category (for example, a same type of animals or plants, or other types that may be classified as the same), or the like, to reflect association of the image information at the same sorting position, provided that it can be clearly identified in a final display diagram that there is an obvious association between data value sets at the same sorting position, and a display form or category of the data value set is obviously different from that of a data value set at any other sorting position. In another example embodiment, sorting may be performed in descending order, ascending order, or in another manner, provided that it is agreed that sorting is performed based on a same sorting rule at time interval points. A specific sorting rule is not limited herein.

In an embodiment of this application, average values of values of representation indicators of a plurality of objects at the sampling time points may be further calculated. For example, there may be various possible manners of calculating an average value, for example, an arithmetic mean, a root mean square, a harmonic mean, a moving average, an arithmetic-geometric mean, or a geometric-harmonic mean. For example, in FIG. 4a, average values of the representation indicators of the three virtual machines are calculated by using the arithmetic mean, and the average values at the sampling time points T1 to T4 are sequentially 400, 450, 390, and 420. Image information used to display changes of the calculated average values may be determined based on the average values. To distinguish from a data set at each of other sorting positions during display, association information in the image information of the average values is represented as being different from association information in image information at any other sorting position. The presentation in FIG. 4b is still used as an example. The association information in the image information of the average values is represented by using a diamond.

Figure 6:
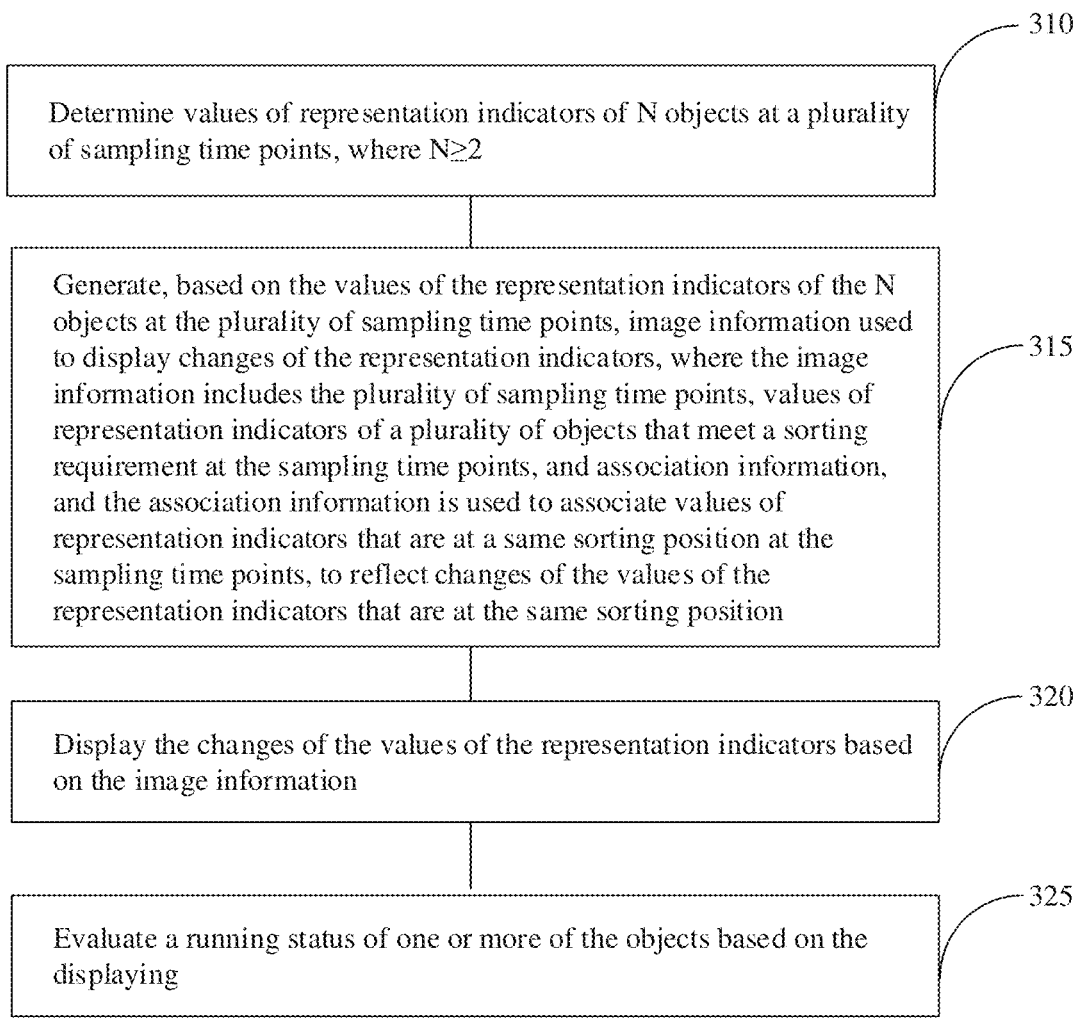
FIG. 6 is another schematic flowchart of a method for displaying a representation indicator of an object according to an embodiment of this application.
Figure 7:
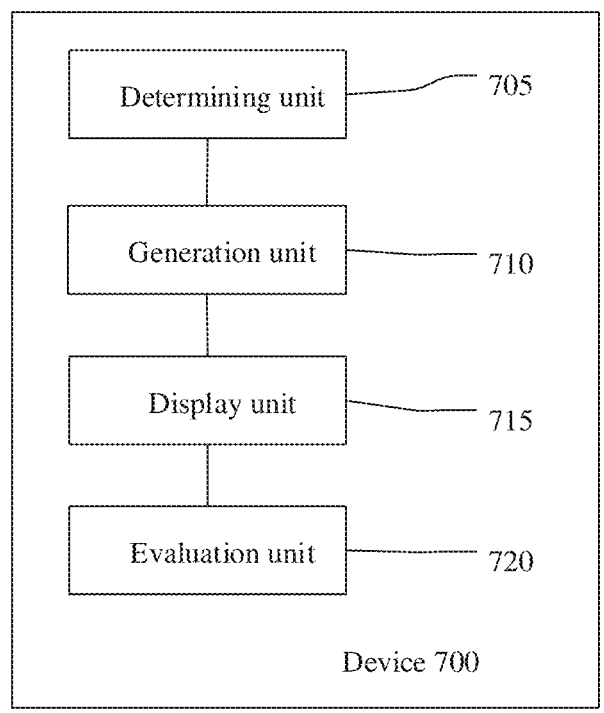
FIG. 7 is a schematic diagram of a device for displaying a representation indicator of an object according to an embodiment of this application.

In another embodiment of this application, the method further includes the following content shown in FIG. 6.

S320. Display the changes of the values of the representation indicators based on the image information.

The changes of the values of the representation indicators are displayed based on the image information generated in S315. FIG. 4b is used as an example. Changes of the values of the representation indicators of the three virtual machines are displayed by using the image information that is of the data value sets at the three sorting positions and that is generated in S315. It may be learned with reference to FIG. 4a and FIG. 4b that at the sampling time point T1, a virtual machine 1 ranks first in terms of a value of a representation indicator, and the value is 500; at the sampling time point T2, the virtual machine 1 still ranks first in terms of the value of the representation indicator, and the value is 550; at the sampling time point T3, a virtual machine 2 ranks first in terms of the value of the representation indicator, and the value is 450; and at the sampling time point T4, the virtual machine 2 ranks first in terms of the value of the representation indicator, and the value is 550. The foregoing information is respectively used as numerical information at the first sorting position at the four sampling points in the image information. In addition, to explicitly represent an association between the information, it is determined that the association information in the image information is represented by using a circle in S315. Therefore, during display, in FIG. 4b, the value of the representation indicator at the first sorting position is displayed as a circle at the corresponding position. Further, to more clearly display an association between the value points at the first sorting position, the four value points displayed as circles may be connected by a broken line. Similarly, in FIG. 4b, the value set at the second sorting position and the value set at the third sorting position are respectively presented by using a broken line on which value locations are marked as triangles and a broken line on which value locations are marked as crosses, to display corresponding changes in an associated manner. Further, value points of the average values at the sampling points in FIG. 4b are connected by a dashed line.

In an embodiment of this application, broken lines only at some specified sorting positions may be selected for display, for example, a broken line only at the first sorting position is displayed, and not broken lines at all sorting positions are displayed. In addition, herein, selecting a broken line or a dashed line for connection is merely used as a possible implementation form. In another embodiment, a curve or another form of line may be selected for connection, or no connection is established, and only a scattered point diagram is presented. In this embodiment, devices or components for performing S315 and S320 may be the same or different.

When two mutually independent devices perform S315 and S320, a device for performing S315 may send the image information to a device for performing S320, so that the device for performing S320 may perform display based on the image information.

Further, to help a user use and intuitively and quickly obtain information at each key display position, an identifier of an object and a value of a representation indicator that correspond to a specific sorting position at each sampling time point may be further displayed. In this embodiment, the "identifier" of the object refers to identification information that may uniquely identify the object in a required range, for example, an IP address, a MAC address, or a product serial number of a device, or a serial number or a name of application software, or a process name.

In an example embodiment, it may be set to directly display identifiers of objects and values of representation indicators that correspond to a plurality of sorting positions at the plurality of sampling time points. Alternatively, it may be set that a hovering time of a mouse of the user is detected, and when the hovering time meets a specified determination time, an identifier of an object and a value of a representation indicator that correspond to a hovering position are displayed. Certainly, setting may be performed based on any required rule. For example, when the mouse hovers over a sampling time point for a long enough time, identifiers of objects and values of representation indicators that correspond to a plurality of sorting positions at the sampling time point are displayed. This is merely used for illustration. This is not specifically limited herein. As shown in FIG. 4b, for example, if the mouse of the user hovers near a key display position with a largest value in the value set at the first sorting position, when the mouse of the user hovers for a long enough time, an identifier of an object and a value of a representation indicator that correspond to the key display position may be displayed. That is, "virtual machine 1" and "550" are displayed in an example layout manner.

In another embodiment of this application, the method further includes S325 shown in FIG. 6.

S325. Evaluate a running status of one or more of the objects based on the displaying.

Figure 5A:
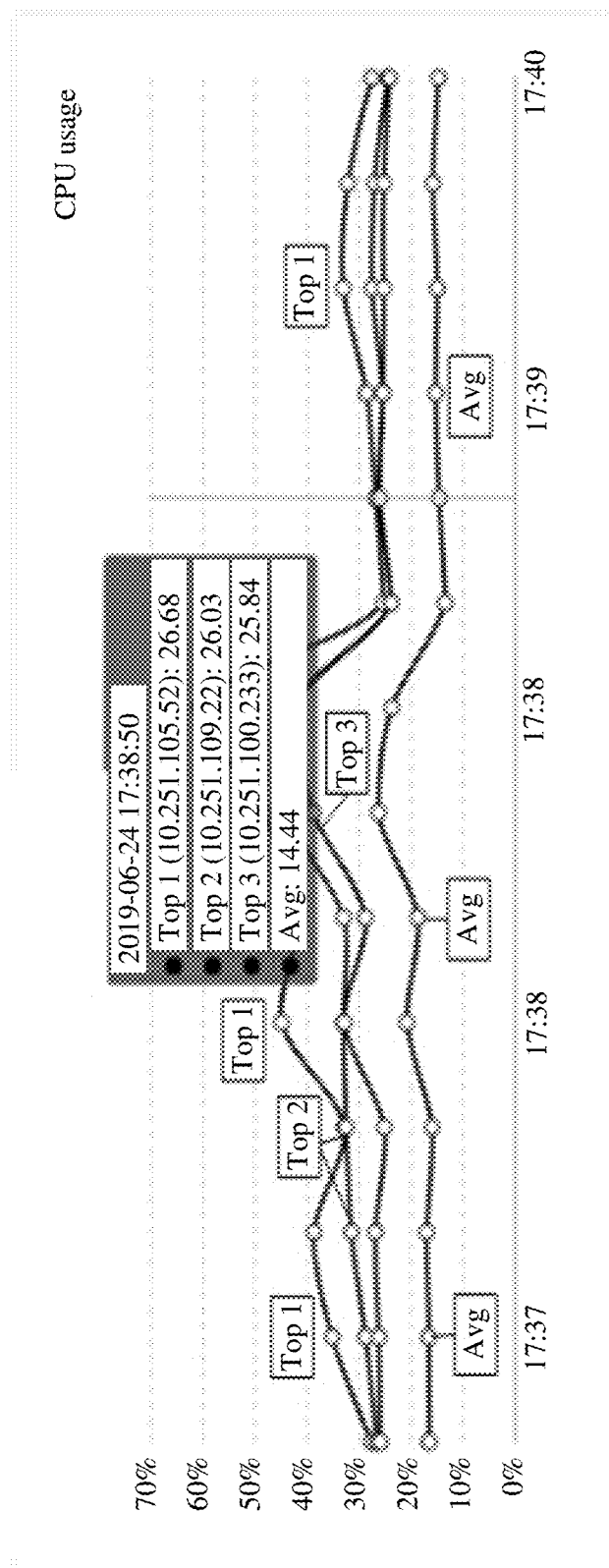
FIG. 5a to FIG. 5d are other schematic diagrams of displaying changes of representation indicators according to an embodiment of this application.

For better description, a schematic diagram of displaying changes of representation indicators provided in this embodiment is first shown herein. The schematic diagram is derived from a possible actual application scenario. In the application scenario, the monitoring device 200 samples CPU usage values of 80 virtual machines in a distributed cluster environment, and sampling time points are set at an interval of 10 s from 18:57 to 19:26. The monitoring device 200 generates image information used to display changes of CPU usage values at the top three sorting positions at the sampling time points, and generates image information used to display average values of the CPU usage values of the 80 virtual machines at the sampling time points. The monitoring device 200 or a display device independent of the monitoring device 200 displays the changes of the CPU usage values of the 80 virtual machines based on the image information, as shown in FIG. 5a. In FIG. 5a to FIG. 5d, each fully connected curve represents information at a specific sorting position. In actual display, when display needs to be performed at relatively many key positions and the sampling time points are relatively dense, a disordered and confusing display effect is presented if excessive shapes are used for displaying associations. In this case, associations of different sorting positions may be distinguished by using different colors. In an embodiment, particular sorting may be represented by using a particular color. For example, a change (namely, a curve top 1 in the figure) at the first sorting position is displayed by using a red line, and a change (namely, a curve top 2 in the figure) at the second sorting position and a change (namely, a curve top 3 in the figure) at the third sorting position are respectively displayed by using an orange line and a yellow line, and the change (namely, a curve Avg in the figure) of the average values is displayed by using a green line. Further, when the mouse of the user hovers over a specific sampling time point for a long enough time, IP addresses of virtual machines that rank top three for CPU usage and CPU usage values corresponding to the virtual machines at the sampling time point may be displayed. For example, based on FIG. 5a, at 17:38:50, an IP address of a virtual machine with a largest CPU usage value is 10.251.105.52, and in this case, peak CPU usage is 26.68%. IP addresses of virtual machines whose CPU usage values rank second and third and the CPU usage values respectively corresponding to the virtual machines are also displayed. In addition, an average value, namely, 14.44%, of peak CPU usage of the 80 virtual machines at 17:38:50 is displayed.

It should be further noted that CPU usage values at a same sorting location at different sampling time points may correspond to different virtual machines. Different virtual machines may be distinguished by using identifiers of the virtual machines, for example, IP addresses of the virtual machines. For example, at 17:00, an IP address of a virtual machine with the highest CPU usage is 10.180.129.78, and in this case, the peak CPU usage is 25.51% (not shown in the figure, which is merely used as an example for description). This is different from the IP address of the virtual machine with the largest CPU usage value at 17:38:50, and therefore it may be determined that the two virtual machines with the highest CPU usage at the two moments are different virtual machines.

Based on the foregoing schematic diagram that represents the changes of the CPU usage values of the 80 virtual machines, a running status of each virtual machine in the distributed cluster environment is then analyzed and evaluated based on the display. For example, a virtual machine that abnormally runs in a specific time period may be found by locating a peak point of the displayed sorting curve; an overall health condition of a device may be learned of by observing an average value curve of a plurality of virtual machines; and a distribution status of the virtual machines in the cluster environment can be evaluated by determining a difference between a representation indicator of a virtual machine with a high rank and an overall average value.

S310 to S325 may be performed by one device, for example, the monitoring device 200, or may be performed by a plurality of devices. For example, S310 and S315 are performed by one device, and S320 and S325 are performed by another device, or S310 to S325 are respectively performed by four devices.

Figure 5B:
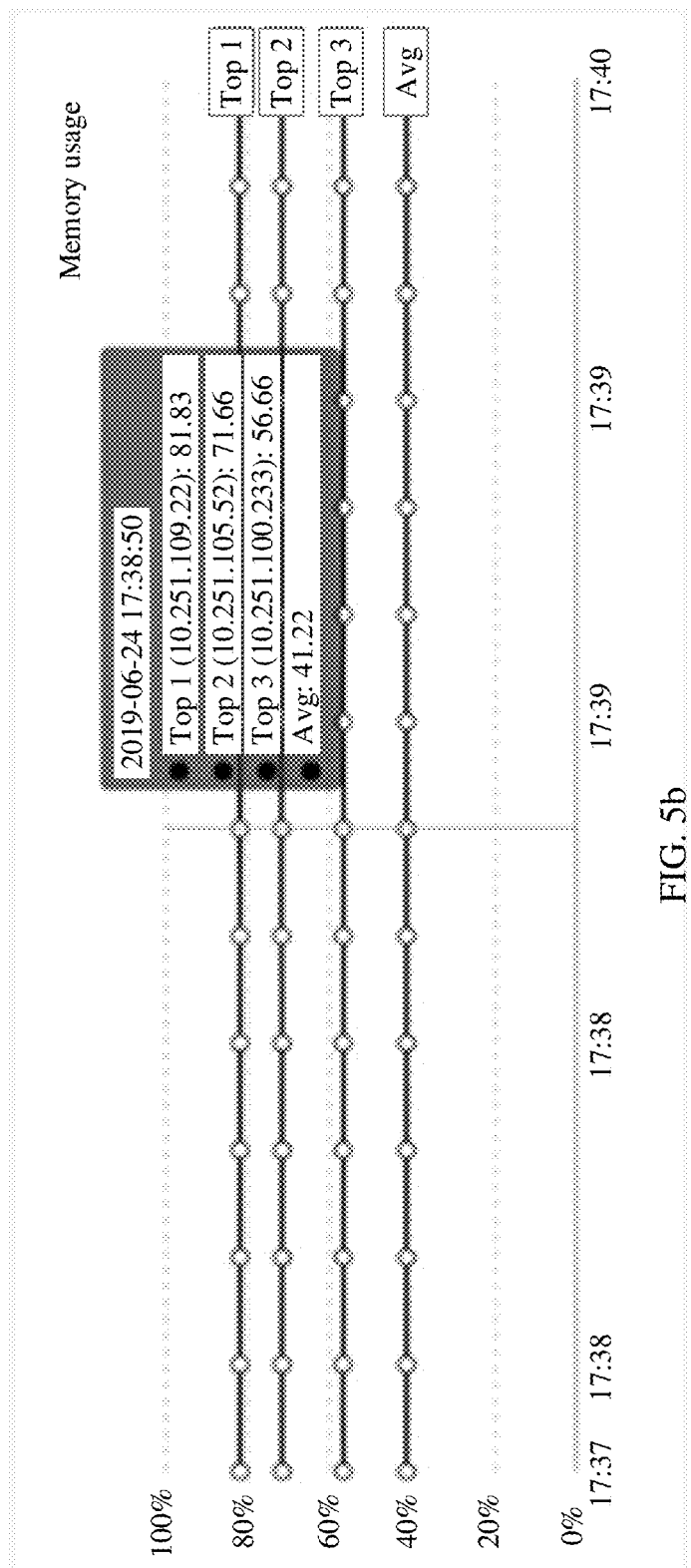
Figure 5C:
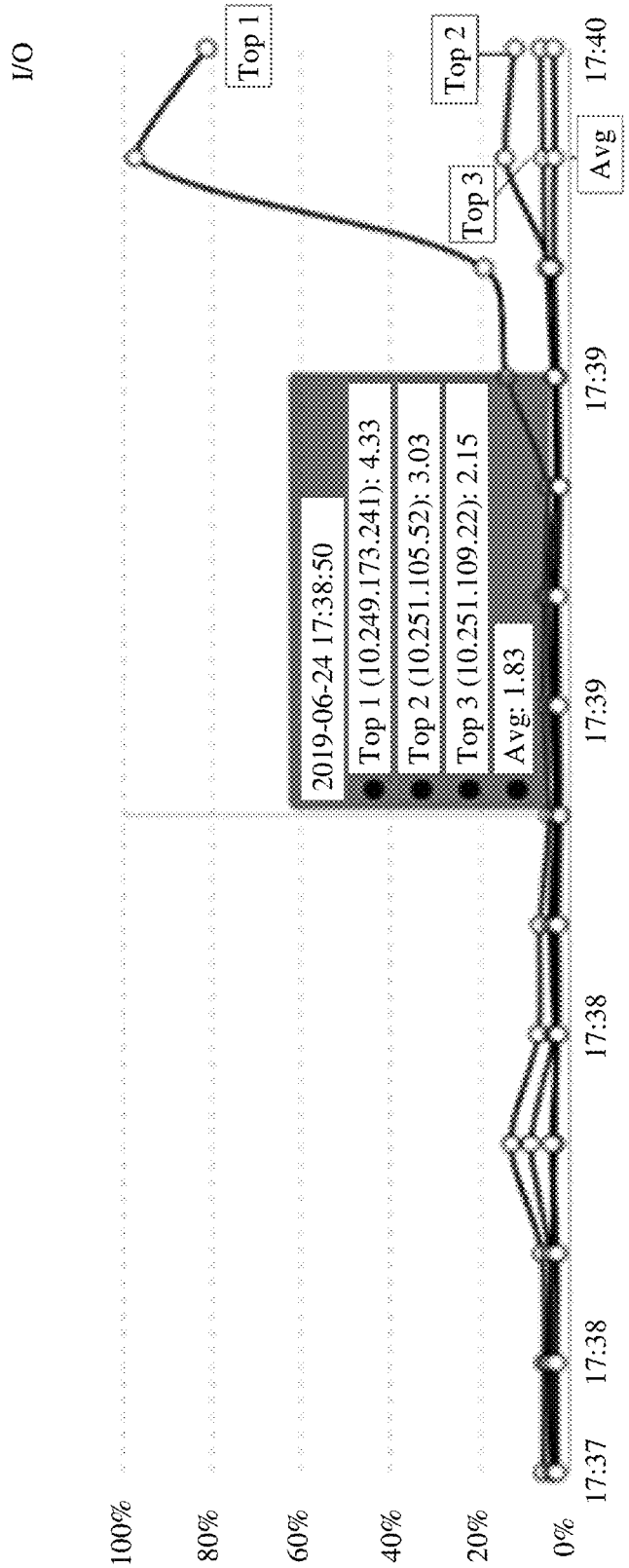
Figure 5D:
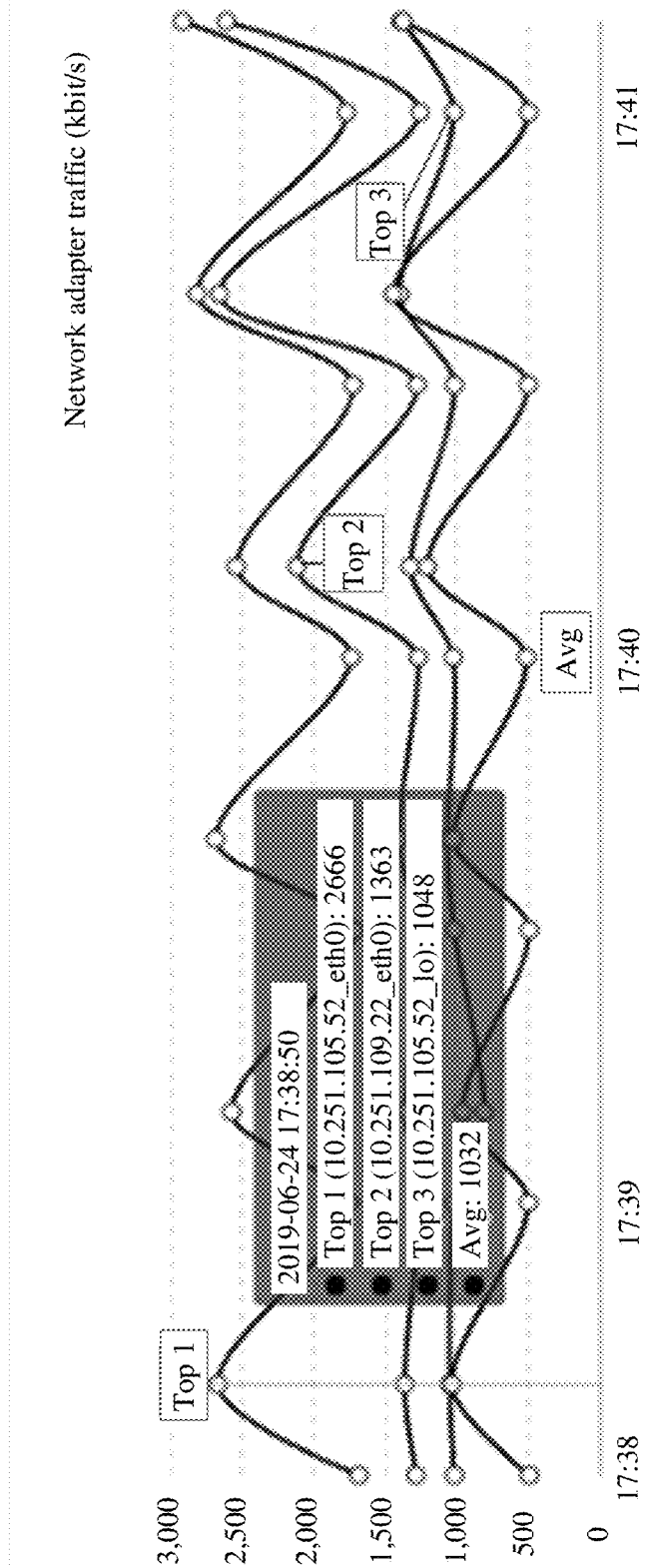

In another embodiment of this application, a cause for abnormality of a virtual machine and the like may be analyzed and determined in a plurality of dimensions by comparing change curves of a plurality of representation indicators in a same time period. For example, FIG. 5b to FIG. 5d are schematic diagrams of change curves of three other representation indicators, including memory usage, I/O, and network adapter traffic, of the 80 virtual machines. By associatively comparing the schematic diagrams of the change curves of the four representation indicators, it is not difficult to find that a virtual machine whose IP address is 10.251.105.52 has the highest CPU usage at 17:38:50, and memory usage and network adapter traffic of the virtual machine are also relatively high at the sampling time point, and are respectively 71.66% and 2666 kbit/s that respectively rank second and first in corresponding representation indicators of the plurality of virtual machines at the sampling time point. However, virtual machines whose I/O ranks top three do not include the IP address. Therefore, it can be quickly determined that abnormal CPU usage of the virtual machine 10.251.105.52 is very likely caused by relatively high memory usage and network adapter traffic of the virtual machine at the same time.

In another embodiment of this application, it may be set to display changes of representation indicators only at some sorting positions. For example, for FIG. 5a, selection buttons corresponding to the four change curves top 1, top 2, top 3, and Avg may be provided, only a change curve corresponding to a selected button is displayed, and a button that is not selected is displayed in gray.

In this embodiment, abnormal information of values of specific representation indicators of a plurality of objects in a network environment can be intuitively displayed, and an object that abnormally runs in a sampling period can be quickly located, thereby greatly improving abnormality check efficiency of the monitored objects. Evaluation of an overall health condition of the plurality of objects in the network environment may be further facilitated by displaying changes of average values of the representation indicator of the plurality of objects. In addition, a cause for abnormality of a virtual machine and the like may be further analyzed and determined in a plurality of dimensions by comprehensively comparing changes of a plurality of representation indicators of a plurality of objects in a same sampling period.

An embodiment of this application further provides a device 700 for displaying a representation indicator of an object. The device 700 includes a determining unit 705, a generation unit 710, a display unit 715, and an evaluation unit 720. The units may be respectively configured to implement the corresponding functions performed in S310 to S325 in the foregoing method embodiments. Details are as follows:

The determining unit 705 is configured to determine values of representation indicators of N objects at a plurality of sampling time points, where N≥2.

The generation unit 710 is configured to generate, based on the values of the representation indicators of the N objects at the plurality of sampling time points, image information used to display changes of the representation indicators. The image information includes the plurality of sampling time points, values of representation indicators of a plurality of objects that meet a sorting requirement at the sampling time points, and association information, and the association information is used to associate values of representation indicators that are at a same sorting position at the sampling time points, to reflect changes of the values of the representation indicators that are at the same sorting position.

The display unit 715 is configured to display the changes of the values of the representation indicators based on the image information.

The evaluation unit 720 is configured to evaluate a running status of one or more of the objects based on the displaying.

Both the display unit 715 and the evaluation unit 720 are optional units.

An embodiment of this application further provides a computer-readable storage medium. The storage medium stores a computer program, and the computer program is used to perform the method for displaying a representation indicator of an object described in the foregoing embodiments.

An embodiment of this application further provides a device. The device includes one or more processors and a memory. The memory is configured to store a computer program, and the one or more processors are configured to invoke the computer program stored in the memory, to perform the method for displaying a representation indicator of an object described in the foregoing embodiments. For example, the device may be the monitoring device 200 shown in FIG. 2.

The parts in this specification are all described in a progressive manner, for same or similar parts in the embodiments, refer to these embodiments, and each embodiment focuses on a difference from other embodiments. Especially, the device embodiment is basically similar to a method embodiment, and therefore is described briefly; for related parts, refer to descriptions in the method embodiment.

It should be understood that sequence numbers of the foregoing method do not mean execution sequences in various embodiments of this application. The execution sequences of the method should be determined based on functions and internal logic of the method, and should not be construed as any limitation on the implementation processes of the embodiments of this application.

The foregoing embodiments are merely intended for describing the technical solutions of this application, and are not intended for limiting this application. Although this application is described in detail with reference to the foregoing embodiments, a person of ordinary skill in the art should further understand that any modification or variation to the technical solutions described in the foregoing embodiments or equivalent replacement to some technical features thereof shall fall within the spirit and the scope of the technical solutions of the embodiments of this application.

What is claimed is:

1. A method for displaying on a display diagram a representation indicator of an object, comprising:
    determining values of representation indicators of N objects at a plurality of sampling time points, wherein N≥2; and
    generating, based on the values of the representation indicators of the N objects at the plurality of sampling time points, a plurality of pieces of image information for displaying changes of at least some of the representation indicators, wherein the plurality of pieces of image information comprises the plurality of sampling time points, values of the representation indicators of one or more of the N objects that meet a sorting requirement at the plurality of sampling time points, and association information, and the association information associates values of representation indicators that are at a same sorting position at the plurality of sampling time points, to reflect changes of the values of the representation indicators that are at the same sorting position,
    wherein each of the representation indicators of the objects is an indicator that can reflect a running status or a health status of the corresponding object.

2. The method according to claim 1, wherein the object is hardware, software or a component there of.

3. The method according to claim 2, wherein the object is a virtual machine included in a network in a cluster environment.

4. The method according to claim 1, further comprising: displaying the changes of the values of the representation indicators that are at the same sorting position based on the plurality of pieces of image information.

5. The method according to claim 4, wherein the plurality of pieces of image information further comprises identifiers of the one or more of the N objects that meet the sorting requirement at the plurality of sampling time points, and each of the identifiers uniquely identifies one of the N objects; and
    the displaying of the changes of the values of the representation indicators that are at the same sorting position comprises: simultaneously displaying identifiers of objects and values of representation indicators that correspond to one or more specified sorting positions at a specific sampling time point.

6. The method according to claim 1, wherein the association information is represented as that the values of the representation indicators that are at the same sorting position at the plurality of sampling time points are displayed by using a same feature.

7. The method according to claim 6, wherein the same feature is a same color, size, shape, or category.

8. The method according to claim 1, wherein the association information is represented as that the values of the representation indicators that are at the same sorting position at the plurality of sampling time points are connected to form a complete broken line or curve in a same color, and broken lines or curves formed by values of representation indicators at different sorting positions are different in color.

9. The method according to claim 1, wherein each of the representation indicators comprises a CPU usage, a memory usage, an I/O, a network delay, a packet loss rate, traffic, queries per second (QPS), transactions per second (TPS), a duration time (DT), or a disk space usage.

10. A device for displaying on a display diagram a representation indicator of an object, wherein the device comprises a memory and one or more processors, and the one or more processors are configured to:
    determine values of representation indicators of N objects at a plurality of sampling time points, wherein N≥2; and
    generate, based on the values of the representation indicators of the N objects at the plurality of sampling time points, a plurality of pieces of image information for displaying changes of at least some of the representation indicators, wherein the plurality of pieces of image information comprises the plurality of sampling time points, values of the representation indicators of one or more of the N objects that meet a sorting requirement at the plurality of sampling time points, and association information, and the association information associates values of representation indicators that are at a same sorting position at the plurality of sampling time points, to reflect changes of the values of the representation indicators that are at the same sorting position,
    wherein each of the representation indicators of the objects is an indicator that can reflect a running status or a health status of the corresponding object.

11. The device according to claim 10, further comprising a display, configured to display the changes of the values of the representation indicators that are at the same sorting position based on the plurality of pieces of image information.

12. The device according to claim 11, wherein the one or more processors are further configured to evaluate a running status of one or more of the N objects based on the displaying of the changes of the values of the representation indicators that are at the same sorting position.

13. The device according to claim 11, wherein the plurality of pieces of image information further comprises identifiers of the one or more of the N objects that meet the sorting requirement at the plurality of sampling time points, and the identifiers each uniquely identifies one of the N objects; and the displaying of the changes of the values of the representation indicators that are at the same sorting position comprises: simultaneously displaying identifiers of objects and values of representation indicators that correspond to one or more specified sorting positions at a specific sampling time point.

14. The device according to claim 11, wherein the plurality of pieces of image information further comprises average values of the values of the representation indicators of the N objects at the plurality of sampling time points; and the displaying of the changes of the values of the representation indicators that are at the same sorting position comprises: displaying changes of the average values.

15. The device according to claim 14, wherein only some specified sorting positions and/or corresponding changes of the average values are displayed by controlling button selection.

16. The device according to claim 10, wherein the association information is represented as that the values of the representation indicators that are at the same sorting position at the plurality of sampling time points are displayed by using a same feature.

17. The device according to claim 16, wherein the same feature is a same color, size, shape, or category.

18. The device according to claim 10, wherein the association information is represented as that the values of the representation indicators that are at the same sorting position at the plurality of sampling time points are connected to form a complete broken line or curve in a same color, and broken lines or curves formed by values of representation indicators at different sorting positions are different in color.

19. The device according to claim 10, wherein the plurality of pieces of image information respectively reflects the changes of the values of the representation indicators that are at the same sorting position.

20. The device according to claim 10, wherein the representation indicator comprises a CPU usage, a memory usage, an I/O, a network delay, a packet loss rate, traffic, queries per second (QPS), transactions per second (TPS), a duration time (DT), or a disk space usage.

* * * * *